United States Patent [19]

Bemmels

[11] 4,179,415

[45] Dec. 18, 1979

[54] PRESSURE SENSITIVE ADHESIVE AND PROCESS

[75] Inventor: Cyrus W. Bemmels, North Brunswick, N.J.

[73] Assignee: Johnson & Johnson, New Brunswick, N.J.

[21] Appl. No.: 822,455

[22] Filed: Aug. 8, 1977

[51] Int. Cl.² .............................. C09J 3/12; C09J 3/14
[52] U.S. Cl. ...................................... 260/4 R; 260/5; 260/29.3; 260/27 BB; 260/29.7 D; 525/185; 427/207 B
[58] Field of Search .......... 260/27 BB, 5, 4 R, 29.7 D

[56] References Cited

U.S. PATENT DOCUMENTS

| | | | |
|---|---|---|---|
| 3,103,858 | 9/1963 | Lauren | 94/22 |
| 3,412,061 | 11/1968 | Drukker | 260/29.7 |
| 3,625,807 | 12/1971 | Beemer | 260/27 BB |
| 3,644,251 | 2/1972 | Wilhelmi | 260/27 BB |

*Primary Examiner*—John C. Bleutge
*Attorney, Agent, or Firm*—Alice O. Robertson; Charles A. Harris

[57] ABSTRACT

A water based rubber resin pressure-sensitive adhesive produced by mixing a high solids resin solution with an isoprene containing latex together with a small amount of carboxylation at a pH of at least about 8. The tackifier resin is added to the rubber latex in a high solids resin solution in an organic solvent. Preferably this solution contains a small amount of a polar solvent such as isopropyl alcohol. The carboxylation may be derived either from using a carboxylated latex or from using a carboxylated resin in the resin solution, or a combination of both of these. The resin solution is dispersed in the water system of the latex in a finely divided state. This preferably is accomplished by adding the resin solution to the latex system slowly with high shear agitation.

17 Claims, No Drawings

PRESSURE SENSITIVE ADHESIVE AND PROCESS

The present invention relates to water-based pressure-sensitive adhesives, more particularly to such adhesives which have high performance characteristics and are adapted to replace industrial solvent-based pressure-sensitive adhesives across their full range of utility.

One of the most common methods for applying pressure-sensitive adhesives has been to dissolve the adhesive in an organic solvent, apply the solution to a substrate by any of a number of standard coating techniques, and then drive off the solvent by heating the coated substrate in an oven. This system has two basic defects, namely, cost and air pollution, since the adhesive formulations generally employ from about 60 to 70 percent by weight of expensive solvents which are removed from the coated product and may be completely wasted in the process. Means for recovering the solvent have been used but this requires the installation of an expensive solvent recovery system and an appreciable increase in floor space to house the necessary equipment. An alternate method is to use incinerators on the coaters to burn the solvent but this is extremely wasteful and costly. Calendering and extrusion coating have been utilized to apply pressure sensitive adhesives without solvents but these systems have limitations in the types of raw materials which can be processed and also require the expenditure of large sums of money for those companies equipped only with conventional solvent coating and drying equipment.

A number of procedures have been tried to make water dispersed pressure-sensitive adhesives which can be applied utilizing conventional coating and drying equipment. However, the resulting adhesives have lacked the necessary balance of properties, i.e., adhesion, hold, quickstick and high temperature performance characteristics. Furthermore, they often require cumbersome and time consuming procedures for preparing the dispersion.

Attempts have been made to produce water based pressure-sensitive rubber resin adhesives by adding tackifying resin dispersions to rubber latices without much success. The resulting adhesives lack good quickstick and display heavy ghosting when tapes coated therewith are removed from a metal panel. U.S. Pat. No. 3,380,938 discloses a modification to this approach wherein an addition polymer latex is added to the rubber latex to produce a pressure-sensitive adhesive. The addition polymers referred to are various types of acrylates. Such acrylate polymers and copolymers are not considered to be satisfactory tackifiers for rubber based compositions since the resulting adhesives do not possess satisfactory performance characteristics.

U.S. Pat. Nos. 3,015,638 and 3,412,061 disclose adding melted tackifier resin to a rubber latex to produce a water based system. In the former the tackifier is added in two steps, first as a dispersion and second as a melt. In the latter, the tackifier resin is melted with oil and then added to the latex as a hot blend. Adhesives of this type are not suitable for most pressure-sensitive tape applications although they may be satisfactory for attaching floor tiles.

U.S. Pat. No. 2,411,905, discloses the production of a reclaimed rubber composition which is kneaded while hot as water is slowly mixed into the system. An alkali such as potassium hydroxide is added and phase inversion occurs. This system is limited to reclaimed rubber, cannot use any heat reactive additives, and is permanently water sensitive due to the fixed caustic used to prepare the dispersion. Furthermore it requires a time consuming mixing procedure.

I now have discovered that a superior water-based pressure-sensitive adhesive can be produced by mixing a high solids resin solution with an isoprene containing latex together with a small amount of carboxylation at a pH of at least about 8.

The adhesive of my invention comprises a mixture of a latex component comprising polymeric elastomer solids in a water system, and a high solids resin solution in an organic solvent with the resin solution dispersed in the water component. The isoprene containing latex component comprises a major solids proportion of isoprene polymer portions, i.e., about 50–100 percent isoprene portions by weight of the elastomer solids in the latex. The term "isoprene polymer portions" means polyisoprene and those portions of isoprene copolymers with other substances which are, attributable to, or derived from polyisoprene or isoprene monomers. The latex may be a natural rubber or a synthetic polyisoprene latex, or it may be a blend of latices in which polyisoprene or a polyisoprene copolymer is one of the components. Similarly, it may be a copolymer of polyisoprene with another elastomer such as butadiene. Other components of the latex may be butadiene, chloroprene, butylene and the like, as well as various copolymers of such materials with one another or with small amounts of a reinforcing monomer such as styrene, acrylonitrile and the like. For instance in copolymers with styrene, less than about 25 percent styrene by weight of the copolymer should be employed.

The high solids resin solution comprises a major amount i.e., about 50–90 percent, preferably about 70–90 percent, of resin solids dissolved in an organic solvent therefor. The resin solids consist predominantly of conventional tackifier resins for pressure-sensitive adhesives. These include rosin, rosin derivatives, polyterpene resins, hydrocarbon resins and others. Secondary resins, such as oil soluble phenol formaldehyde resins, coumarone indene resins, alpha methyl styrene resins and similar reinforcing resins which can add to the adhesion, high temperature performance and curing properties may be included in small amounts generally not above about 25 parts per 100 parts of resin solids. These secondary resins are not intended to be used as the primary tackifier for the adhesive.

When the term "solids" is used in this application it refers to that portion of the adhesive constituent referred to which is nonvolatile and therefore will remain in solid or semi-liquid form in the adhesive after the adhesive composition is coated and dried. This is conventional usage in the adhesive tape industry. Thus, the "solids" portion of the "high solids resin solution" may include resin ingredients which normally are liquid at ambient temperatures.

The resins are dissolved in a suitable solvent such as toluene, heptane, or another suitable alphatic or aromatic solvent. It is preferable to use a small amount of a polar solvent such as isopropyl alcohol. The latter helps to wet and emulsify the resin solution in the water phase of the latex. It also helps to minimize foaming. It is believed that the polar solvent eventually is extracted into the water phase and helps reduce the surface tension of the latex and wet the substrate to which the adhesive is applied.

Oils and other conventional plasticizers may be added in the resin solution. Similarly, other nonelastomeric constituents of the adhesive composition such as the antioxidants, which are soluble in the resin solution, may be added to this solution for incorporation into the composition.

The proportion of the resin solution is adjusted with respect to the proportion of the latex so that the resin solids from the solution are present in the amount of about 50-200 parts per 100 parts by weight of the elastomer solids from the latex. The amount of total solvent in the final adhesive generally is less than about 20 percent of the total adhesive solids. The amount of polar solvent should not be more than about 10 percent of the weight of the total water in the system.

A small amount of carboxylation also is present to assure stability in the adhesive composition of this invention. This carboxylation may be provided either by employing a carboxylated polymer in the latex or by using a minor amount of carboxyl containing resin in the resin solution and preferably a combination of both of these is employed. The amount of carboxylation on the latex polymer has a greater influence on stability than the carboxylation on the resin in the resin solution. If the carboxylation is only on the polymer, at least about 0.25 parts COOH groups per 100 parts by weight of elastomer solids should be employed, whereas at least about 0.75 parts COOH groups per 100 parts by weight of elastomer solids should be used for best results if the carboxylation is only on the resin. If both a carboxylated latex polymer and a carboxylated resin are employed, somewhat lower levels of carboxylation on the polymer and/or the resin will give satisfactory results.

In practising my invention it is preferred to use a major proportion of natural rubber blended in the latex with a minor proportion of a carboxyl containing latex polymer such as carboxylated butadiene latex, carboxylated butadiene-styrene, or carboxylated chloroprene latex. However, a carboxylated resin such as a disproportionated rosin may be used in a somewhat greater proportion in the resin solution for the same purpose as explained above. Preferably, again, best results are obtained by using such a carboxylated latex blend together with a carboxylated resin of the type described.

The pH of the resulting adhesive composition is maintained above about 8, preferably above about 9, by the inclusion of a suitable basic material such as ammonia, an amine such as dimethyl ethanol amine, or the like.

Any conventional anti-oxidants may be included to stabilize the aging of the adhesive. These include ditertiary amyl hydroquinone the butylated reaction product of paracresol and dicyclopentadiene, 1,3,5-trimethyl-2,4,6-tris(3,5-di-tertiary butyl-4-hydroxy benzyl) benzene, metal dithiocarbamates such as zinc di-isobutyl dithiocarbamate, and others.

Polyvalent metal oxides such as zinc oxide may be used to enhance the curing characteristics of the adhesive but care must be exercised to prevent gellation prior to coating. Either the adhesive must be mixed and coated immediately or a chelating agent, such as dimethyl ethanol amine should be employed to stabilize the latex system. If a carboxylated elastomer is used, one must limit the amount of carboxylation or limit the amount of polyvalent metal oxide in order to prevent excessive cross-linking in the coated product. Excessive cross-linking would drastically affect the quickstick properties.

Small amounts of additional wetting agents such as sodium alkyl aryl sulfonate or non ionic surfactants may be used but excessive amounts (greater than about two parts per 100 parts by weight of elastomer solids) may cause excessive foaming and may result in some ghosting and detackification.

It is preferable to use only about 0.5-1.0 parts of additional wetting agent per 100 parts of elastomer solids. Defoamers are very helpful in minimizing foaming both during the mixing and coating operations. Silicone defoamers should be avoided since they cause excessive detackification.

Thickeners such as hydroxy methyl cellulose, hydroxy ethyl cellulose, carboxylic acid polymers, etc. normally are used to raise the viscosity to a suitable coating level. A viscosity of about 1,000-3,000 centipoises provides a good coating consistency. Fillers and colorants such as clay, titanium dioxide and the like may be employed to modify the physical characteristics and appearance of the adhesive.

The water soluble and water dispersed ingredients are added first in producing the latex component or system. The resin solution normally is added later. However, the elastomeric latices may be added in more than one step, and one constituent of the latex component, such as the carboxylated polymer portion, may be added to the latex system prior to adding and mixing in the resin solution and another portion, such as the natural rubber, may be added after the resin solution. In any case, the resin solution is added slowly with vigorous, or high shear, agitation, such as provided by a high speed homogenizer or colloid mill, to assure that the resin solution is dispersed in the latex system in a finally divided state. It is desirable to coat at maximum solids in order to minimize the amount of water and solvent to be removed. The systems described hereinafter in the Examples coat well in the range of about 45-60 percent solids.

The following Examples illustrate various embodiments of the adhesive composition of this invention. In the Examples, proportions are expressed in parts by weight with respect to the total weight of the composition. In Tables A and B, which illustrate "wet" adhesive formulations as mixed in the presence of water and solvents, the parts are chosen for convenience in mixing and processing. In Table C, the formulations are figured "dry" and represent the "wet" formulations of Tables A and B after coating and drying, and the proportions are reduced to parts per one hundred parts by weight of the total elastomer solids. In Table D the "wet" formulations are expressed as in Tables A and B and the "dry" formulations are expressed as in Table C and represent the "wet" formulations of Table D after coating and drying. All percentages in the Tables are percent solids in water unless otherwise indicated.

TABLE A

| Ingredients | I | II | III | IV | V | VI |
|---|---|---|---|---|---|---|
| A.S.P. 200 clay | | | 75 | | 60 | 75 |
| Dimethyl ethanol amine (DMEA) | 5 | 5 | 5 | 5 | 5 | 5 |
| Titanium dioxide dispersion, 50% | | | | 50 | | |

TABLE A-continued

| Ingredients | I | II | III | IV | V | VI |
|---|---|---|---|---|---|---|
| Zinc di-isobutyl dithiocarbamate, antioxidant, 50% dispersion | 12 | 12 | 12 | | 12 | 12 |
| Wingstay L, antioxidant, 50% dispersion | 6 | 6 | 6 | 5 | 6 | 6 |
| Natrosol 250 HR, thickener, 2% solution | 50 | 50 | | 175 | 50 | 25 |
| Dowfax 2A-1, wetting agent, 10% solution | 15 | 15 | 15 | 125 | 15 | |
| Distilled water | 163 | 143 | 156 | 253 | 196 | 63 |
| Neoprene 101, carboxylated chloroprene latex, 47% | | | | 136 | | |
| Goodyear Bx61J6794, carboxylated butadiene latex, 39% | | | | | 189 | |
| Dow 8937.02, carboxylated butadiene-styrene, 75-25, latex 44% | 102 | 170 | 170 | | | |
| Polysar XD947, carboxylated butadiene-isoprene, 33.3-66.7, latex 48% | | | | | | 312 |
| Firestone H-104, natural rubber latex, 63% | 405 | 357 | 357 | 298 | 357 | 242 |
| Nopco NDW, antifoaming agent | 3 | 3 | 3 | 2.5 | 3 | 3 |
| Zinc oxide dispersion, 20% solids in 40% DMEA and 40% Natrosol 250HR, 2% | 90 | | | | | |
| Resin Solution A | 405 | | | 255 | 445 | 405 |
| Resin Solution B | | 405 | | | | |
| Resin Solution C | | | 460 | | | |
| Wingtack 10, tackifier resin | | | | 250 | | |

Referring to Table A, Examples I–VI illustrate the preparation of adhesive compositions of this invention in accordance with the process of this invention. The ingredients are added and mixed into the formulation in the order in which they are listed from top to bottom of the Table. In the process of this invention shown in Table A, antioxidants, thickeners, additional wetting agents, pigments and fillers and the base, DMEA, are added to begin the latex system followed by the carboxylated elastomer and the natural rubber. The latex system is completed by the addition of an antifoaming agent and, in the case of Example I, a zinc oxide dispersion to improve high temperature performance. Then the high solids resin solution is vigorously mixed into the latex system by a high shear device such as a homogenizer; the resin solution having been previously formulated in organic solvent as indicated in Table B, wherein proportions are expressed in parts by weight of the composition as in Table A.

TABLE B

| Ingredients | Resin Solution A | Resin Solution B | Resin Solution C |
|---|---|---|---|
| Wingtack 95, tackifier resin | 165 | | 240 |
| Wingtack 10, tackifier resin | 60 | 60 | 90 |
| Piccolyte S-115, tackifier resin | | 165 | |
| NC-11, carboxylated resin | 30 | 30 | 30 |
| Amberol ST137, 60% in toluene | 75 | 75 | |
| Toluene | 45 | 60 | 87.5 |
| Isopropyl alcohol | 30 | 15 | 12.5 |
| Total | 405 | 405 | 460 |

After the adhesive compositions are thoroughly mixed they are coated onto impregnated backsized creped kraft backing paper of the type conventionally used in the pressure-sensitive adhesive tape industry employing a conventional adhesive coating technique. The coated paper next is passed through a drying oven to remove the volatile constituents and dry the adhesive. Then it is slit into tapes approximately one inch wide which are tested for adhesive strength and quickstick.

TABLE C

| Ingredients and Characteristics | I | II | III | IV | V | VI |
|---|---|---|---|---|---|---|
| Neoprene 101, carboxylated chloroprene | | | | 25 | | |
| Goodyear Bx61J6794, carboxylated butadiene | | | | | 25 | |
| Dow 8937.02, carboxylated (75-25) butadiene-styrene copolymer | 15 | 25 | 25 | | | |
| Polysar XD947, carboxylated (33.3-66.7) butadiene-isoprene copolymer | | | | | | 50 |
| Firestone H-104, natural rubber | 85 | 75 | 75 | 75 | 75 | 50 |
| Wingtack 95, tackifier resin | 55 | | 80 | 40.7 | 68.75 | 55 |
| Wingtack 10, tackifier resin | 20 | 20 | 30 | 114.8 | 25 | 20 |
| Piccolyte S-115, tackifier resin | | 55 | | | | |
| NC-11, carboxylated resin | 10 | 10 | 10 | 7.4 | 12.5 | 10 |
| Amberol ST 137 | 15 | 15 | | 11.1 | 18.75 | 15 |
| A.S.P. 200 clay | | | 25 | | 20 | 25 |
| Titanium dioxide | | | | 10 | | |
| Zinc di-isobutyl dithiocarbamate | 2 | 2 | 2 | | 2 | 2 |
| Wingstay L, antioxidant | 1 | 1 | 1 | 1 | 1 | 1 |
| Natrosol 250 HR, thickener | 0.6 | 0.3 | | 1.4 | 0.3 | 0.17 |
| Dowfax 2A-1, wetting agent | 0.5 | 0.5 | 0.5 | 0.5 | 0.5 | |
| Nopco NDW, antifoaming agent | 1 | 1 | 1 | 1 | 1 | 1 |
| Zinc Oxide | 18 | | | | | |
| Coating weight, oz./sq. yard | 1.6 | 1.6 | 2.12 | 1.85 | 1.76 | 1.83 |
| Adhesion, lbs./in. of width | 34 | 34 | 29 | 24 | 34 | 44 |
| Quickstick | 10 | 0.4 | 32 | 32 | 16 | 11.4 |

TABLE C-continued

| Ingredients and Characteristics | Examples | | | | | |
|---|---|---|---|---|---|---|
| | I | II | III | IV | V | VI |
| COOH groups on the polymer | 0.25 | 0.42 | 0.42 | 0.16 | 0.12 | 0.72 |
| COOH groups on the resin | 1.25 | 1.25 | 1.25 | 0.93 | 1.56 | 1.25 |

Adhesive strength or adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure Sensitive Tape Council.

Quickstick is measured by laying a length of tape, adhesive side up, on a horizontal surface and then rolling a plastic ping pong ball down an incline onto the adhesive. The vertical height at which the ball starts and the distance the ball rolls along the tape before coming to rest is measured. Quickstick is reported as the height in inches raised to the three-halves power, divided by the distance rolled in inches. This ratio is found to be a constant for a given tape. The ball used in approximately 1 inch in diameter, and weighs approximately 2 grams. Its outer surface is carefully cleaned between each test.

The "dry" proportions of the various ingredients of the adhesive compositions and tapes of Examples I–VI including the amount of carboxylation in parts COOH groups per one hundred parts by weight of the total elastomer solids, as well as the coating weights and adhesion and quickstick values for the tapes of these Examples, all are shown in Table C. It will be seen that the tapes of these Examples possess an excellent balance of adhesive strength and quickstick. This is particularly true for the adhesives formulated principally with Wingtack-type hydrocarbon tackifier resins.

The amount of carboxylation both for Examples I–VI shown in Table C and for Examples VII–IX indicated in the following Table D are expressed in terms of "COOH groups on the polymer" (i.e., the polymeric elastomer solids) and "COOH groups on the resin".

The COOH groups on the polymer are defined as COOH groups which are titratable, i.e., readily neutralized by alkali in the water phase and therefore serve to improve the stability of the latex. We believe that these COOH groups exist on the interface of the latex particles and the water phase. The titratable COOH groups on the polymer groups can be readily determined by a simple wet titration technique. The latex is first extracted with a cation exchange resin such as Dowex 50 W+8 to remove $NH_4+$ and alkali metal ions. The extracted latex then is titrated with a dilute standardized KOH solution using phenolphalein indicator. This provides a measure of the total acidity and is expressed as an acid number (mg.KOH to neutralize one gram of material [dry weight]) Next, another portion of latex is coagulated, the clear supernatent liquid is extracted with the cation exchange resin and then titrated with the standardized dilute KOH solution. This provides a control or a measure of the acid groups in the water not associated with the COOH groups attached to the polymer micelles. The titratable COOH group acid number then may be calculated by subtracting the acid number for the control from the acid number representing total acidity. The resulting acid number then is converted to titratable COOH groups or COOH groups on the carboxylated polymer by multiplying by 0.08025. The figures obtained from this calculation are converted to parts by weight per one hundred parts of the total elastomer solids by multiplying by the fraction obtained by dividing the parts carboxylated elastomer solids by the parts total elastomer solids.

The COOH groups on the resin are determined by A.S.T.M. Procedure D465-59 described on Page 649 of Book No. 29 of the A.S.T.M. Standards for 1974 which actually gives the corresponding acid number. The resulting acid number is converted to percent or parts per one hundred parts resin by multiplying by 0.08025 and then to parts by weight per one hundred parts of the total elastomer solids by multiplying by the fraction obtained by dividing parts carboxylated resin by parts total elastomer solids.

Dowex 50 WX8 consists of beads of styrene - divinyl benzene polymer with 8 percent crosslinks and a bead size of 20–50 mesh by wet screen analysis. The beads have sulfonic acid groups to extract the $NH_4+$ and the metal ions and are prepared in accordance with U.S. Pat. Nos. 2,366,007, 2,591,573 and 2,591,574.

Referring to Table D, Examples VII, VIII and IX further illustrate the preparation of adhesive compositions of this invention in accordance with the process of this invention. The formulations of Examples VII–IX are prepared and coated onto crepe kraft backing paper, dried, slit into tapes and tested for adhesive strength and quickstick as described for Examples I–VI. Example VII illustrates a composition of this invention with carboxylation only on the elastomer solids, whereas Example IX illustrates a composition with carboxylation only on the resin. Example VIII illustrates a resin solution which contains no alcohol. All of these examples produce tapes which possess an excellent balance of physical properties as measured by adhesive strength and quickstick.

TABLE D

| Ingredients and Characteristics | Example VII | | Example VIII | | Example IX | |
|---|---|---|---|---|---|---|
| | Wet | Dry | Wet | Dry | Wet | Dry |
| Dimethyl ethanol amine (DMEA) | 5 | | 5 | | 10 | |
| Zinc di-isobutyl dithiocarbamate, 50% dispersion | 12 | 2 | 12 | 2 | 12 | 2 |
| Wingstay L, antioxidant, 50% dispersion | 6 | 1 | 6 | 1 | 6 | 1 |
| Natrosol 250 HR, thickener, 2% solution | 50 | 0.33 | 50 | 0.33 | 50 | 0.33 |
| Dowfax 2A-1, wetting agent, 10% solution | 15 | 0.5 | 15 | 0.5 | 30 | 1 |
| Distilled water | 143 | | 143 | | 174 | |
| Dow 8937.02, carboxylated (75-25) butadiene-styrene copolymer latex, 44% | 170 | 25 | 170 | 25 | | |
| Firestone H-104, natural rubber latex, 63% | 357 | 75 | 357 | 75 | 476 | 100 |
| Nopco NDW, antifoaming agent | 3 | 1 | 3 | 1 | 3 | 1 |

TABLE D-continued

| Ingredients and Characteristics | | Example VII | | Example VIII | | Example IX | |
|---|---|---|---|---|---|---|---|
| | | Wet | Dry | Wet | Dry | Wet | Dry |
| Resin Solution- | Wingtack 95, tackifier resin | 195 | 65 | 165 | 55 | 165 | 55 |
| | Wingtack 10, tackifier resin | 60 | 20 | 60 | 20 | 60 | 20 |
| | NC-11, carboxylated resin | | | 30 | 10 | 30 | 10 |
| | Amberol ST137 | 45 | 15 | 45 | 15 | 45 | 15 |
| | Toluene | 75 | | 105 | | 75 | |
| | Isopropyl alcohol | 30 | | | | 30 | |
| Coating weight, oz./sq. yard | | | 1.85 | | 1.68 | | 1.4 |
| Adhesion, lbs./in. of width | | | 31 | | 39 | | 20 |
| Quickstick | | | 13.4 | | 13.4 | | 40 |
| COOH groups on the polymer | | | 0.42 | | 0.42 | | 0 |
| COOH groups on the resin | | | 0 | | 1.25 | | 1.25 |

In the foregoing examples, Wingstay L antioxidant is the butylated reaction product of paracresol and dicyclopentadiene with a melting point of about 115° C. It is offered by Goodyear Tire and Rubber Co. Natrosol 250HR is a hydroxy ethyl cellulose sold by Hercules Inc. as a thickener for water systems. Dowfax 2A-1 is the sodium salt of an alkylated diphenyl sulfonate with twelve carbon atoms in the alkyl groups. It is sold by Dow Chemical Co. Nopco NDW is a viscous liquid hydrocarbon antifoaming agent containing 0.4 percent silicone and having an acid value of 10 plus or minus 3. It is offered by Diamond Shamrock Co.

Neoprene 101 is a carboxylated noncrystallizing chloroprene latex supplied by E.I. duPont de Nemours at 47 percent solids. It has a tritrated acid number of about 8.13 and about 0.65 percent of titratable COOH groups. Goodyear Bx61J6794 is a carboxylated butadiene latex supplied by Goodyear Tire and Rubber Co. at 39 percent solids. It has a titurated acid number of about 6.11 and about 0.49 percent of titratable COOH groups. Dow 8937.02 is a carboxylated butadiene-styrene latex supplied by Dow Chemical Co. at 44 percent solids. It comprises about 75 percent butadiene and 25 percent styrene, and has a tritrated acid number of about 20.8 and about 1.67 percent of titratable COOH groups. Polysar XD947 is a carboxylated latex supplied by Polysar Ltd. of Canada at 48 percent solids. It comprises about 67 percent isoprene and 33 percent butadiene, and has a tritrated acid number of about 18 and about 1.44 percent of titratable COOH groups. Firestone H-104 is a high ammonia stabilized natural rubber latex supplied by Firestone Tire and Rubber Co. at 63 percent solids.

Wingtack 95 tackifier resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12-15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings or U.S. Pat. No. 3,577,398. This resin possesses a softening point of about 95° C. by the ball and ring method, a number average molecular weight of about 1100 and is offered commercially by Goodyear Tire and Rubber Company.

Wingtack 10 tackifier resin is a liquid tackifier resin also consisting predominantly, i.e., about 75 percent, of polymerized structures derived from piperylene and isoprene. However, this resin is liquid at 25° C. and has a number average molecular weight of about 530. It appears to have at least about 25 percent unsaturation and contains a lesser percentage of structures derived from mono-olefins. It also is sold by Goodyear Tire and Rubber Company.

Piccolyte S-115 tackifier resin is a betapinene resin with a ball and ring melting point of about 115° C. and is supplied by Hercules, Inc. NC-11 carboxylated resin is a disproportionated rosin acid having an acid number of about 155 and about 12.5 percent COOH groups. It also is supplied by Hercules. Inc.

Amberol ST-137 is heat reactive octyl phenol formaldehyde resin with a number average molecular weight of about 875 and having a methylol titration of about 9.7 percent. It is sold commercially by Rohm and Haas Company.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A water-based pressure-sensitive adhesive composition which comprises: a mixture of a latex component comprising polymeric elastomer solids in a water system, and a high solids tackifier resin solution comprising about 50–90 percent tackifier resin solids for pressure-sensitive adhesive dissolved in organic solvent, said resin solution being dispersed in the latex component; said latex component comprising about 50–100 percent isoprene polymer portions by weight of said elastomer solids and said resin solids being present in the amount of about 50–200 parts per 100 parts by weight of said elastomer solids; said composition comprising a small amount of carboxylation in the form of carboxyl groups on the elastomer solids, and having a pH of at least about 8.

2. A water-based pressure-sensitive adhesive composition according to claim 1, wherein said resin solution comprises about 70–90 percent resin solids.

3. A water-based pressure-sensitive adhesive composition according to claim 1, wherein said resin solution also comprises a small amount of a polar solvent for the resin solids.

4. A water-based presssure-sensitive adhesive composition according to claim 3, wherein said polar solvent is present in the amount of not above about 10 parts per 100 parts by weight of the water in the composition.

5. A water-based pressure-sensitive adhesive composition according to claim 3, wherein the polar solvent is an alcohol.

6. A water-based pressure-sensitive adhesive composition according to claim 5 wherein the alcohol is isopropyl alcohol.

7. A water-based pressure-sensitive adhesive composition according to claim 1, wherein said elastomer solids comprise a substantial proportion of natural rubber.

8. The process of producing a water-based pressure-sensitive adhesive composition which comprises mixing in the presence of a small amount of carboxylation:
   (a) a latex component comprising polymeric elastomer solids, said elastomer solids comprising about 50-100 percent isoprene polymer portions by weight, and
   (b) a high solids tackifier resin solution comprising about 50-90 percent tackifier resin solids for pressure-sensitive adhesive dissolved in organic solvent, said resin solids being present in the amount of 50-200 parts per 100 parts by weight of said elastomer solids;
and maintaining said mixture at a pH of at least about 8, said carboxylation being in the form of carboxyl groups on the elastomer solids.

9. The process of producing a water-based pressure-sensitive adhesive composition according to claim 8, wherein said resin solution also comprises a small amount oa a polar solvent for the resin solids.

10. The process of producing a water-based pressure-sensitive adhesive composition according to claim 9, wherein said polar solvent is present in the amount of not above about 10 parts per 100 parts by weight of the water in the composition.

11. The process of producing a water-based pressure-sensitive adhesive composition according to claim 9, wherein the polar solvent is an alcohol.

12. The process of producing a water-based pressure-sensitive adhesive composition according to claim 8, wherein said high solids resin solution is dispersed in the latex component in a finely divided state by vigorous agitation during mixing.

13. The process of producing a water-based pressure-sensitive adhesive composition according to claim 12, wherein the high solids resin solution is added slowly to the latex component with high shear agitation.

14. A water-based pressure-sensitive adhesive composition according to claim 1, wherein the elastomer solids comprise a carboxylated polymer and said carboxylated polymer comprises at least about 0.25 parts carboxyl groups per 100 parts by weight of elastomer solids.

15. A water-based pressure-sensitive adhesive composition according to claim 14, wherein the resin solids comprise a minor amount of a carboxylated resin.

16. The process of producing a water-based pressure-sensitive adhesive composition according to claim 8, wherein the elastomer solids comprise a carboxylated polymer and said carboxylated polymer comprises at least about 0.25 parts carboxyl groups per 100 parts by weight of elastomer solids.

17. The process of producing a water-based pressure-sensitive adhesive composition according to claim 16, wherein the resin solids comprise a minor amount of a carboxylated resin.

* * * * *

UNITED STATES PATENT AND TRADEMARK OFFICE
CERTIFICATE OF CORRECTION

PATENT NO. : 4,179,415
DATED : December 18, 1979
INVENTOR(S) : Cyrus W. Bemmels

It is certified that error appears in the above-identified patent and that said Letters Patent are hereby corrected as shown below:

Col. 7, Line 52, "W + 8" should be -- W X 8 --.
Col. 9, Line 60, "teachings or" should be -- teachings of --.
Col. 11, Line 31, "amount oa" should be -- amount of --.

Signed and Sealed this

First Day of July 1980

[SEAL]

Attest:

SIDNEY A. DIAMOND

Attesting Officer    Commissioner of Patents and Trademarks